United States Patent [19]

Brown

[11] 4,081,829
[45] Mar. 28, 1978

[54] AUDIO ACTIVATED VIDEO DISPLAY

[75] Inventor: Robert J. Brown, Palo Alto, Calif.

[73] Assignee: Atari, Inc., Sunnyvale, Calif.

[21] Appl. No.: 716,765

[22] Filed: Aug. 23, 1976

[51] Int. Cl.² ............................................. H04N 9/02
[52] U.S. Cl. ..................................................... 358/82
[58] Field of Search ............... 358/10, 81, 82; 84/464; 179/15 P

[56] References Cited

U.S. PATENT DOCUMENTS

| 2,858,368 | 10/1958 | Kennedy | 358/10 |
| 3,529,079 | 9/1970 | Moskovitz et al. | 358/10 |
| 3,723,652 | 3/1973 | Alles et al. | 179/1 VS |
| 3,886,588 | 5/1975 | Dalke | 358/82 |
| 3,900,886 | 8/1975 | Coyle et al. | 358/82 |

Primary Examiner—John C. Martin
Attorney, Agent, or Firm—Flehr, Hohbach, Test, Albritton & Herbert

[57] ABSTRACT

An interface unit for providing visual color display of objects on an unaltered TV receiver which are directly associated with the music on an audio source. Audio energy is derived from separate channels of a stereo system. This audio information is presented on the screen in the form of objects in various arrangements. Color is derived based on the zero crossing rate of each channel. Each channel has its own color associated with it. Objects may be solid, or rings, or one may be "subtracted" one from the other. If desired, the different arrays may be selected automatically in a random manner. A spectral color modulator using phase shifted techniques is incorporated.

25 Claims, 27 Drawing Figures

RING

FIG. 2c

HOLE

FIG. 2b

SOLID

LUMINANCE

FIG. 4

COLOR

FIG. 5a    FIG. 5b

OBJECT LOGIC

AUDIO ACTIVATED VIDEO DISPLAY

BACKGROUND OF THE INVENTION

The present invention is directed to an audio activated video display and more specifically to an interface unit for connecting a stereo system to the antenna terminals of a color television receiver.

There have been proposed interface units for connecting an audio source to a standard color televsion receiver via the antenna terminals. There also exist several systems which require direct access to the deflection and other circuits of a television receiver to provide a color or black and white display. For example, Birnbaum et al U.S. Pat. No. 3,175,121 produces a rosette type display. None of the known prior art techniques are believed to adequately produce an entertaining visual color display which is directly associated with an audio source such as music.

OBJECTS AND SUMMARY OF THE INVENTION

It is, therefore, a general object of the present invention to provide an improved interface unit for coupling an audio source to a color television receiver.

It is another object of the invention to provide an interface unit as above which provides a video display which is entertaining to the viewer and has the capability of varying many display parameters.

In accordance with the above objects there is provided apparatus for connecting an audio source to a color television receiver and producing an object on the screen of the receiver which varies both in shape and color. This is in response to changes in the characteristics of an audio signal of the audio source. Means are provided for generating first and second ramp signals each having a period related to the horizontal and vertical trace times of a frame of a television picture. The ramp signals are compared with a characteristic of the audio signal to generate a luminance signal. Color modulator means are responsive to a characteristic of the audio signal for generating a chroma signal. Also provided are means for driving the chroma and luminance circuits of the television receiver with the respective chroma and luminance signals.

BRIEF DESCRIPTION OF THE DRAWINGS

Table I is useful in understanding the operation of FIG. 13.

BRIEF DESCRIPTION OF THE PREFERRED EMBODIMENT

Figure 1:
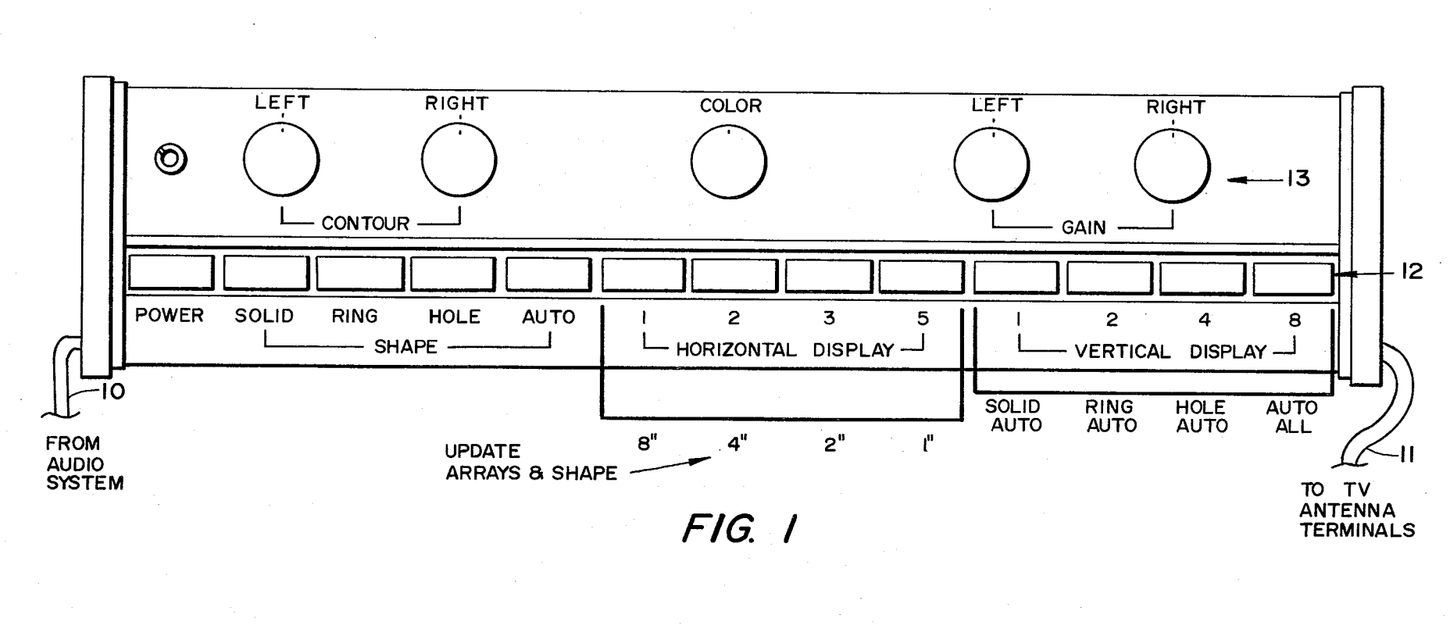
FIG. 1 is a front view of the control panel of apparatus embodying the invention.

FIG. 1 illustrates the control panel of the interface unit of the present invention which receives a signal from the audio system on the lines 10 and couples a suitable radio frequency signal corresponding to one of the TV channels on line 11 to the TV antenna terminals. A row of push buttons 12 provide for power on and off and for mode control. Various shapes can be provided for the display including solid, ring and hole type shapes. The auto push button provides a random display as will be explained in detail below.

In the normal mode of operation, the horizontal and vertical display push buttons numbered 1, 2, 3, 5 and 1, 2, 4, 8, respectively, provide for the display of multiple arrays of the pattern in accordance with the the number of push buttons pressed. For example, with 2 on the horizontal display and 2 on the vertical display a 2 by 2 array would be provided on the screen of the television receiver. When the auto or random button is pressed the horizontal and vertical display push buttons perform different functions as will be described below.

The rotatable control knobs 13 include a color knob which shifts the color range, left and right contour controls which change the smoothness of the objects displayed, the left and right corresponding to the two stereo channels. Finally, the left and right gain controls change the size of the objects being displayed respectively for the left and right stereo channels.

Figure 2A:
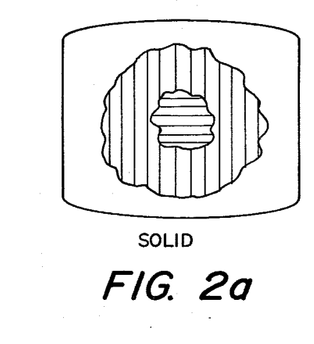
FIGS. 2A-2D illustrate video displays of the invention.
Figure 2B:
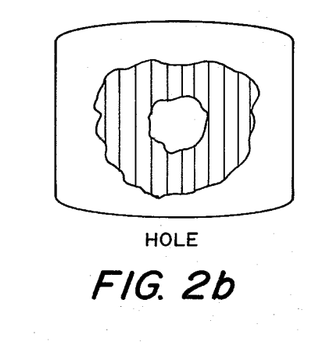
Figure 2C:
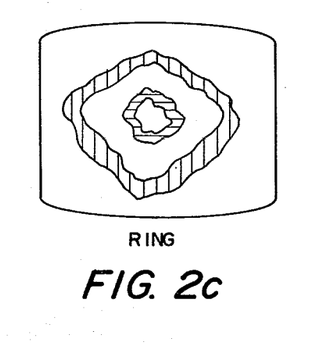
Figure 2D:
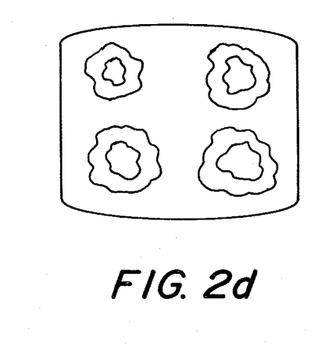

FIGS. 2A through D illustrate a typical display in various modes. Channel 1 and channel 2 correspond to the left and right stereo channels. FIG. 2A shows a solid shape with each channel having a separate color indicated by the vertical lining for channel 1 and the horizontal lining for channel 2. FIG. 2B is a hole type shape which is effectively a difference of the two patterns of FIG. 2A. FIG. 2C is a ring type display. FIG. 2D is a 2 by 2 array as provided by the horizontal and vertical display buttons 2, 2, respectively being pressed.

Figure 3:
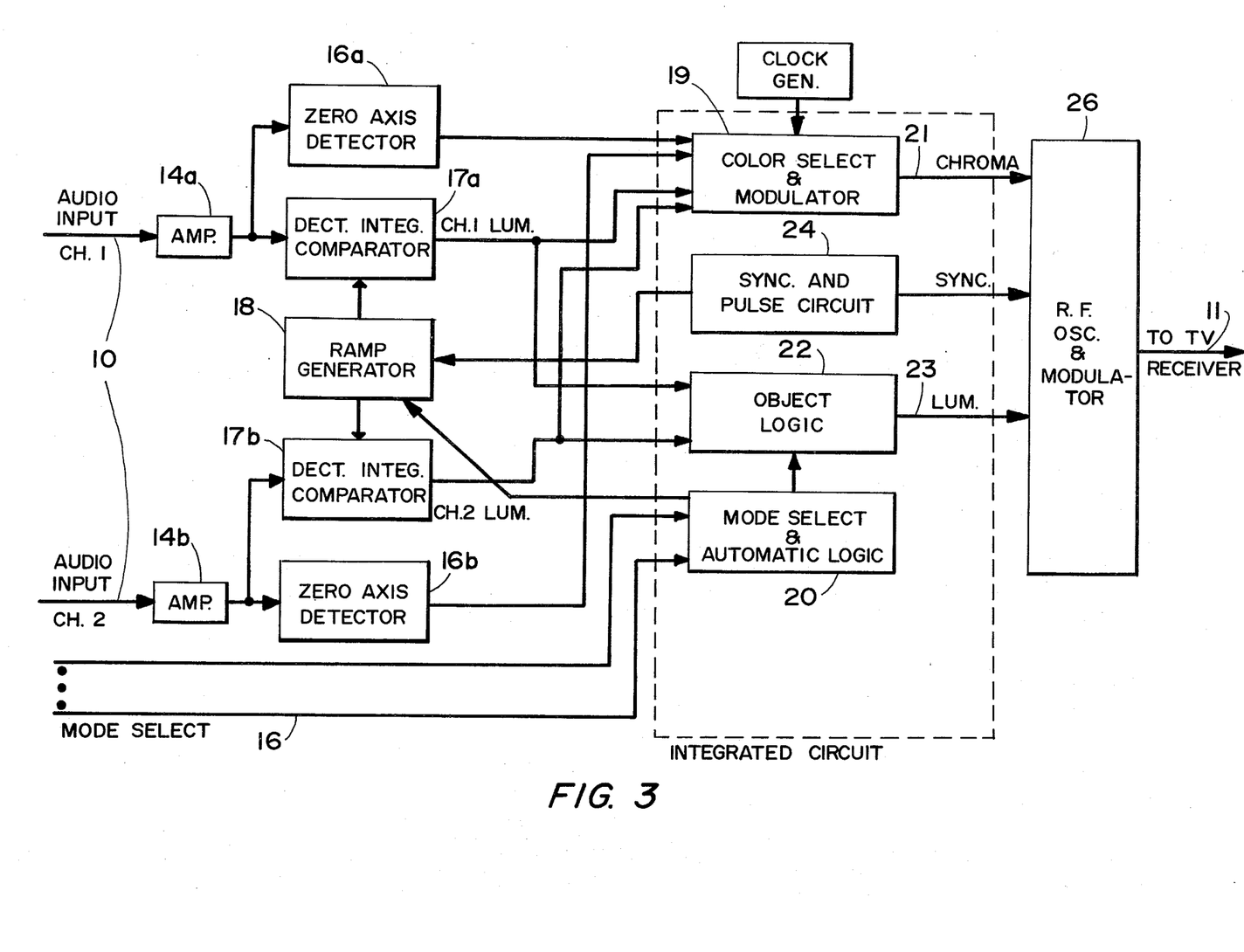
FIG. 3 is a block diagram of the invention.

A simplified block diagram of the circuitry contained in the unit of FIG. 1 is shown in FIG. 3 with the channel 1 and channel 2 audio inputs of line 10 being connected to amplifiers 14a and 14b. The mode select switches including the shape and horizontal and vertical display controls, are inputed on mode select lines 16 into array select and automatic logic unit 20.

The output of the amplifiers 14a, b are coupled both into zero axis detectors 16a, b and detector integrator and comparator units 17a, b. A common ramp generator 18 drives the comparator units 17a, b.

Zero axis detectors 16a, b both contain color information which is connected to color selector modulator unit 19 to provide a chroma signal on line 21. Comparator units 17a, 17b contain luminance information which is connected to object logic unit 22 which produces a luminance signal on line 23. Synchronization and pulse circuits unit 24 provides the well-known color burst signal and vertical and horizontal sync signals which control the remaining blocks and also control the radio frequency oscillator and modulator unit 26. This adds the chroma and luminance signals on lines 21 and 23 to an RF radio frequency signal suitable for reception by the antenna terminals on line 11 of a television receiver. From a construction standpoint, the blocks 19, 20, 22 and 24 could be on a common integrated circuit.

Figure 4:
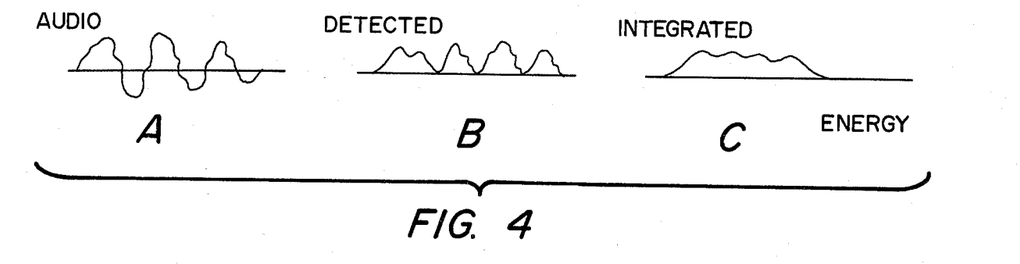
FIGS. 4A-4C are waveforms useful in understanding the invention.

FIGS. 4A, B and C illustrate the action of the detector integrator and comparator units 17a, b where the audio signal shown in FIG. 4A, is detected in FIG. 4B by rectification and then integrated to provide the smoothed signal, designated ENERGY, of FIG. 4C; the integrated signal is a function of the amount of energy contained in the audio signal. This energy signal of FIG. 4C is coupled to the comparator and compared with the signal produced by ramp generator 18 as will be described below.

Figure 5A:
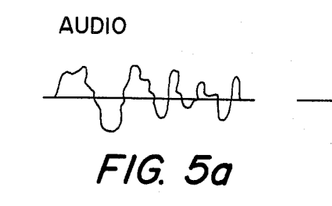
FIGS. 5A and 5B are waveforms useful in understanding the invention.

FIGS. 5A and B illustrate the operation of the zero axis detectors 13a, b where the audio signal of FIG. 5A is converted by a squaring circuit to the signal of FIG. 5B which then has its transitions counted and stored in a register as will also be described below.

Figure 5B:
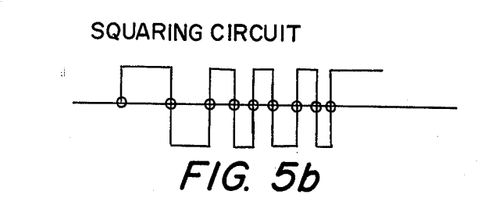

Thus to summarize a luminance signal is provided by the energy of the audio source as illustrated in FIG. 4C and a chroma signal by the zero crossings of the audio source as illustrated in FIG. 5B.

Figure 6:
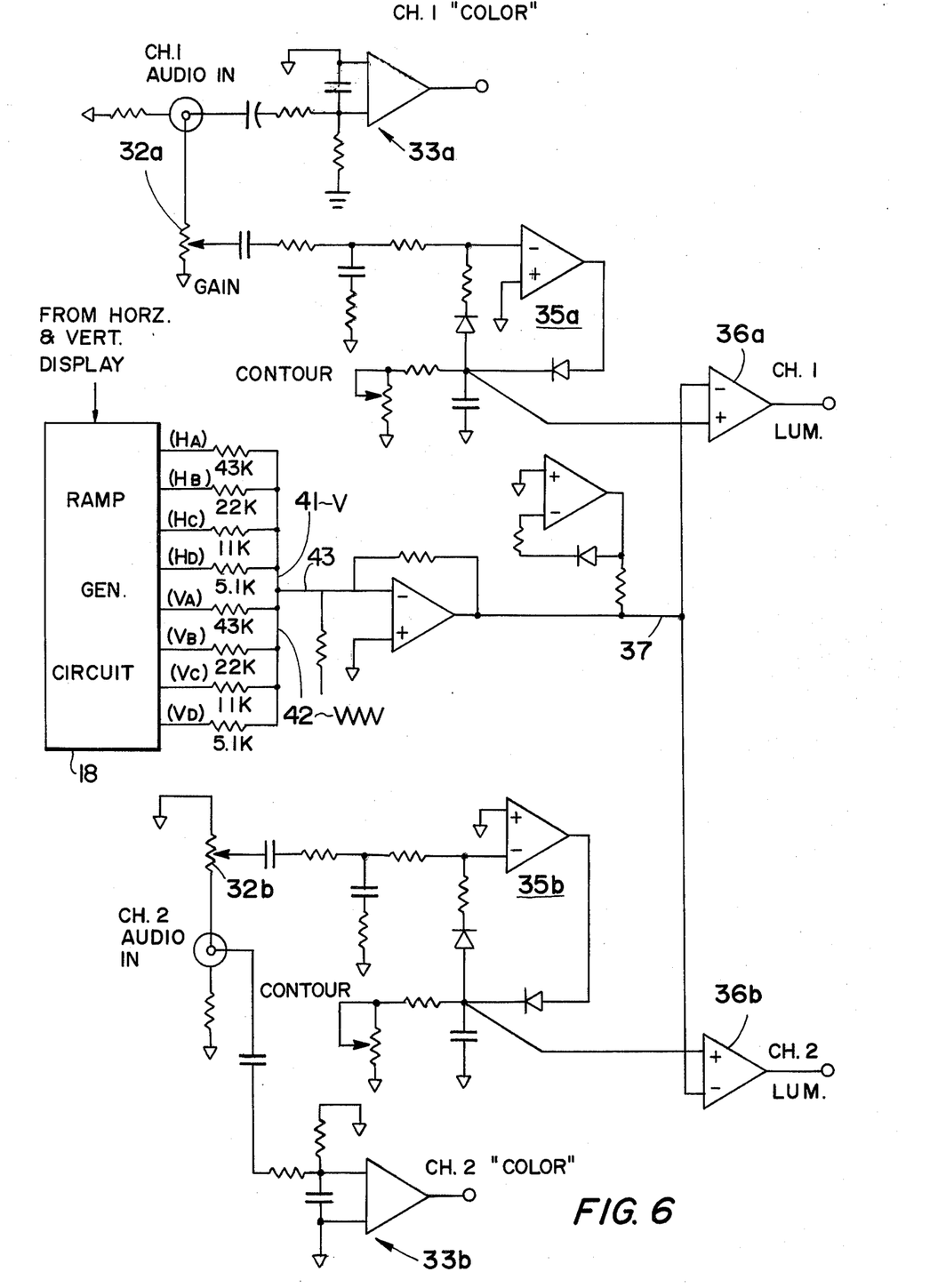
FIG. 6 is a more detailed circuit schematic of a portion of FIG. 3.

The units 14 through 18 of FIG. 3 are partially illustrated in greater detail in FIG. 6 where the channel 1 and channel 2 stereo audio inputs are connected to gain potentiometers 32a, b. These correspond to the left and right gain controls shown in FIG. 1. Squaring circuits 33a, b provide channel 1 and channel 2 squared color signals, illlustrated in FIG. 5B, and are processed by color select and modulator unit 19 (FIG. 3). The detector integrator comparator units 17a, 17b are shown in detail as detector and integrator units 35a, b and comparators 36a, b. The outputs of the detector-integrators 35a, b correspond to the energy signal of FIG. 4C. The integrators also include a potentiometer designated "contour control" which correspond to the equivalent controls illustrated in FIG. 1. These function to smooth the object displayed and this is accomplished by changing the time constants of integration.

Comparators 36a and 36b have as their second inputs a common signal on line 37 which is produced by the ramp generator 18 (FIG. 3). Ramp generator 18 referring to FIG. 6 includes an integrated circuit which produces on its $V_A$ through $V_D$ outputs four signals which count down (from 1111 to 0000) and then up in a binary fashion. These correspond to a binary digital representation of V-shaped ramp signal for each frame. The most significant bit (MSB) normally has a period of approximately 1/60 of a second (or a multiple thereof) to thus correspond to the vertical sync frequency of a television receiver. The four digital signals are converted to an analog signal by the common technique of summing through appropriately weighted resistors to provide a V-shaped waveform indicated at 41. The values of the summing resistors are indicated and correspond to the digital weighting value of each binary signal of the integrated circuit which is 1, 2, 4, 8. Similarly, the $H_A$ through $H_D$ outputs provide a V-shaped waveform indicated at 42 with a fundamental waveform corresponding to the horizontal trace interval of approximately 63.84 microseconds. The two waveforms 41 and 42 are summed at 43 and after shaping and amplification produce the final waveform on line 37 which is utilized by the comparators 36a and 36b to compare with the energy waveform of the audio signals to provide channel 1 and channel 2 luminance signals.

Although in the preferred embodiment the ramp waveforms are summed, they may be separately compared with the energy waveforms of each channel (thus requiring two additional comparators) to produce an interesting TV display which is intrinsically a rectangular object. However, the combination of horizontal and vertical ramp signals produce a diamond shaped object which is more directly associated with the information content of the audio source.

The foregoing technique is one of many ways to generate a V-shaped signal. The ramp generator circuit is capable of having its frequency varied by means of the horizontal and vertical display control illustrated in FIG. 1. That is, the effective frequencies or V-shaped waveforms 41 and 42 can be multiplied by 1, 2, 3, 5 in the case of the horizontal and 1, 2, 4, 8 in the case of the vertical to provide the array formation as illustrated in FIG. 2D. In the preferred embodiment, the digital ramp signals are taken directly from the horizontal and vertical sync counters utilizing very little additional circuitry. The multiple ramps can be achieved by merely shifting to higher order taps.

Figure 7:
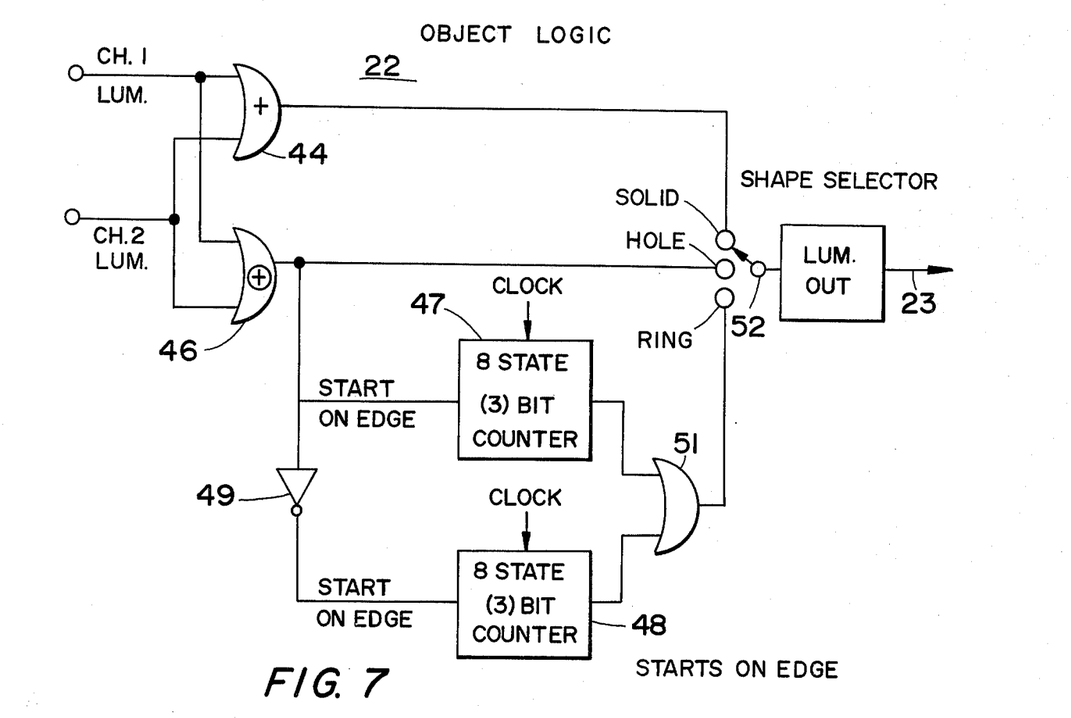
FIG. 7 is a detailed block diagram of a portion of FIG. 3.

The channel 1 and channel 2 luminace output signals of FIG. 6 are connected to the object logic unit 22 which is shown in greater detail in FIG. 7. To produce a solid type display as indicated in FIG. 2A an OR gate 44 ORs the channel 1 and channel 2 signals. Similarly, an exclusive OR gate 46 provides the hole type signal of FIG. 2B. Lastly, a ring type display illustrated in FIG. 2C is provided by the effective one shot delay units which include a pair of three bit eight state counters 47 and 48 which are connected to the output of exclusive OR gate 46. Counter 47 is directly connected and counter 48 is connected through an inverter 49. The outputs of the counters 47 and 48 provide the ring luminance output by means of the OR gate 51. Both counters start on an edge as indicated and are on for a period of seven clock pulses which represents the width of the ring as illustrated in FIG. 2C. Thus, the timing indicated as clock is equivalent to 228 pulses per horizontal line trace. A shape selector switch 52 is equivalent to the shape push buttons of FIG. 1 and selects either the solid, hole or ring modes of operation to provide the final luminace output signal on line 23 which is coupled to the RF oscillator and modulator unit 26.

Figure 8:
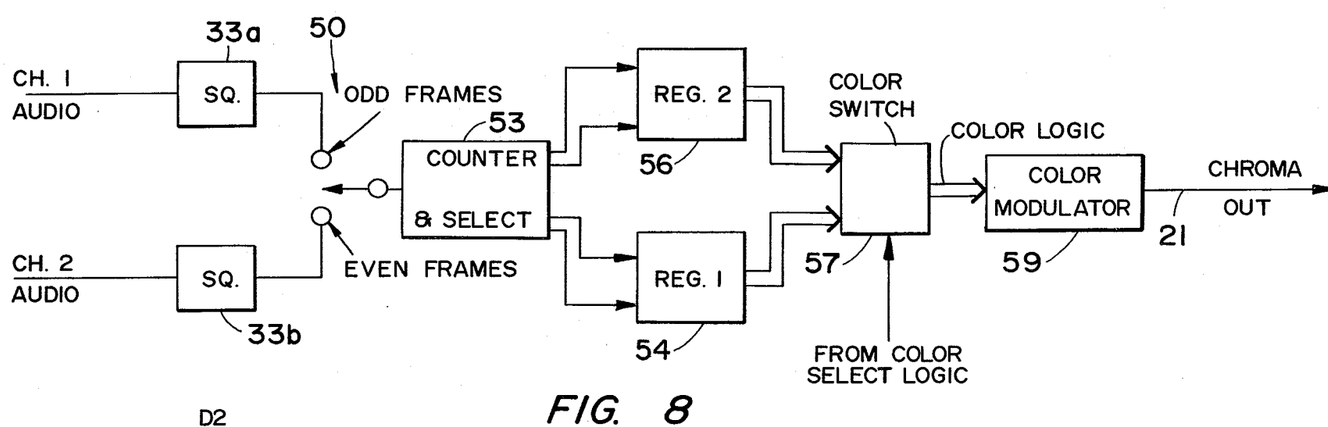
FIG. 8 is a detailed block diagram of a portion of FIG. 3.

The foregoing has thus far described the generation of the luminance signal. The chroma or color signal after being squared as illustrated in FIG. 6 by the squaring circuits 33a and 33b, is processed as illustrated in FIG. 8. The zero crossings of the squared signal of each channel are alternately counted by the counter and select unit 53 which includes the switch 50 which switches between the channels in accordance with even and odd frames of the television receiver. The zero crossing counts for the respective channels are stored in the registers 1 and 2. These registers along with counter 53 play an important part in the random or auto mode of the present invention to be discussed below.

Figure 9:
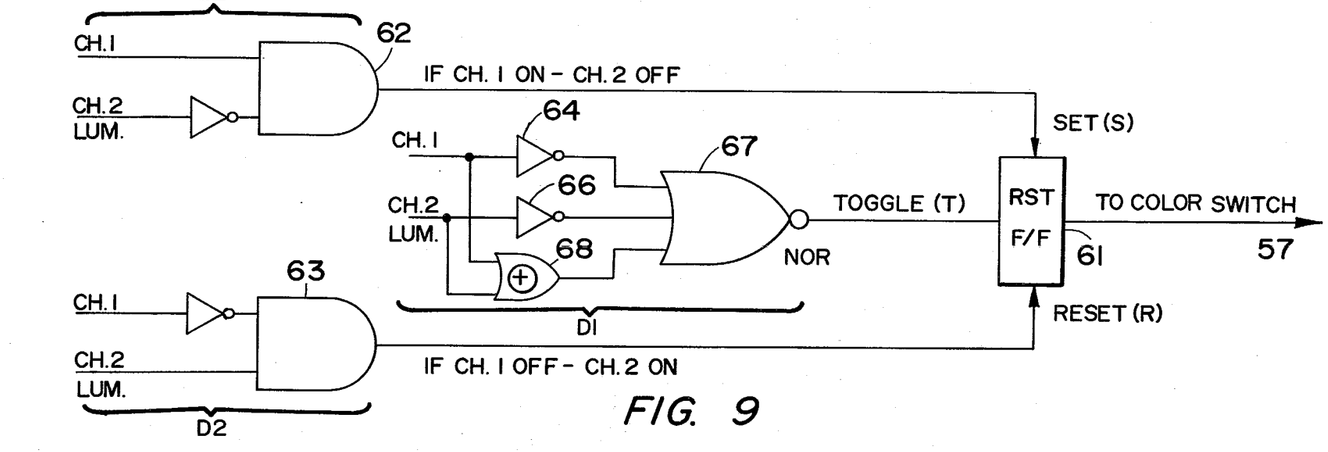
FIG. 9 is a detailed block diagram of a portion of FIG. 3.

The output of registers 54 and 56 are routed through a color switch 57 to drive the color modulator 59 which produces the final chroma signal on line 21. Color switch 57 has its switching action determined by the color select logic of FIG. 9. The color select logic is driven by the channel 1 and channel 2 luminance signals as shown in FIG. 6 which of course are the outputs of the comparator units 17a, 17b of FIG. 3. The two luminance signals are respectively connected to an RST flip-flop 61 through the gates 62 and 63 having delay times D2. With respect to gate 62 the channel 2 input is inverted; in the case of gate 63 the channel 1 input is inverted. The output of gate 62 operates on the logic rule that if channel 1 is on and channel 2 is off, a set input occurs. In the case of gate 63 if channel 1 is off and channel 2 on, a reset input occurs. The flip-flop also has a toggle input activated by the circuit shown which includes a pair of inverters 64 and 66 driving a NOR gate 67 and an exclusive OR gate 68 also driving the NOR gate. This circuit has a delay time of D1. The delays have a magnitude such that the D1 delay is greater than D2.

The overall rule of operation of the color select logic is as follows. If channel 1 and channel 2 are both off color selection is irrelevant. If channel 1 is on and channel 2 is off, flip-flop 61 is set to provide color selected by the channel 1 count. In the opposite mode where channel 1 is off and channel 2 is on, the channel 2 color is selected. Lastly, when both channel 1 and channel 2 are on, the color of the last channel to turn on is selected.

Figure 10:
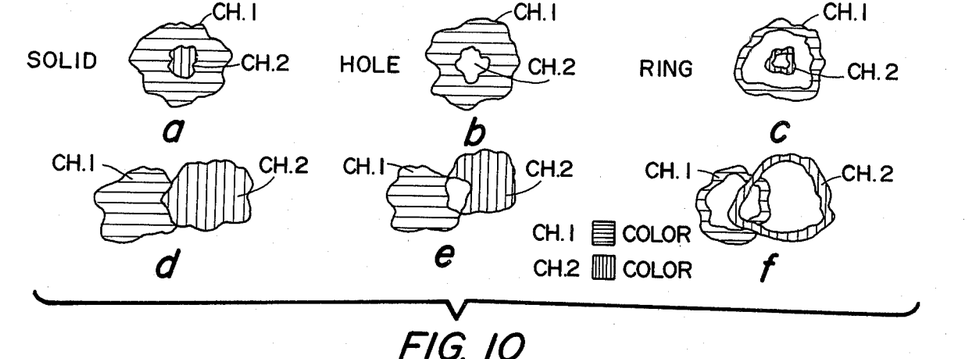
FIGS. 10A-F illustrate video displays of the invention.

The foregoing color selection is shown in FIGS. 10A through F where the FIGS. 10A, B and C illustrate the solid, hole and ring mode the channel 1 color being horizontal lining and channel 2 vertical lining. FIGS. 10D, E and F illustrate the same modes except that the audio signals are displaced because of the characteristic of their energy. FIG. 10 also shows a much smoother outline as opposed to the diamond outline of FIG. 2 because of the type of signal or the action of the contour control.

Figure 11:
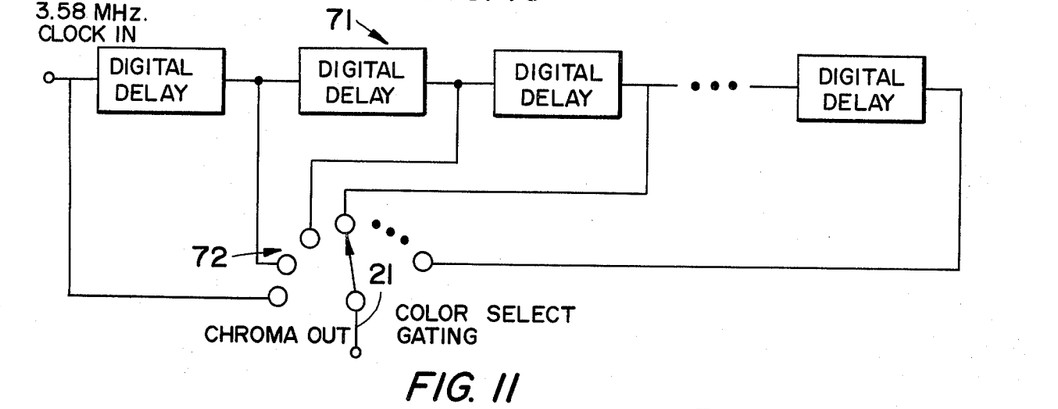
FIG. 11 is a conceptual block diagram of a portion of FIG. 8.
Figure 12:
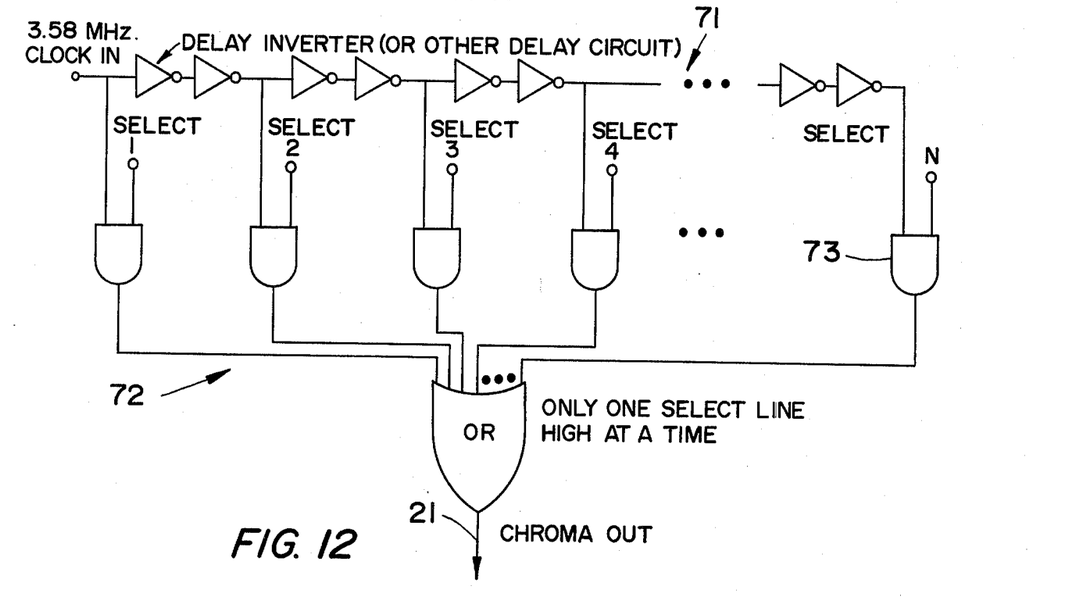
FIG. 12 is a more detailed showing of FIG. 11.

Color modulator 59 is illustrated conceptually in FIG. 11 where the approximate 3.58 megahertz color clock drives several series connected digital delay units 71. A series string of digital delay units is selected by color select gating 72, indicated merely here as a rotary switch, to provide the chroma out signal on line 21 (FIG. 3). FIG. 12 is a more detailed showing where the delay units 71 are actually inverter pairs. Gating 72 includes AND gates 73 driven by select inputs 1 through N which opens only one gate at any time. The select inputs 1 through N of AND gates 73 would be driven, referring to FIG. 8, either by a function derived from the stored counts of register 1 or register 2 (54, 56).

Figure 13:
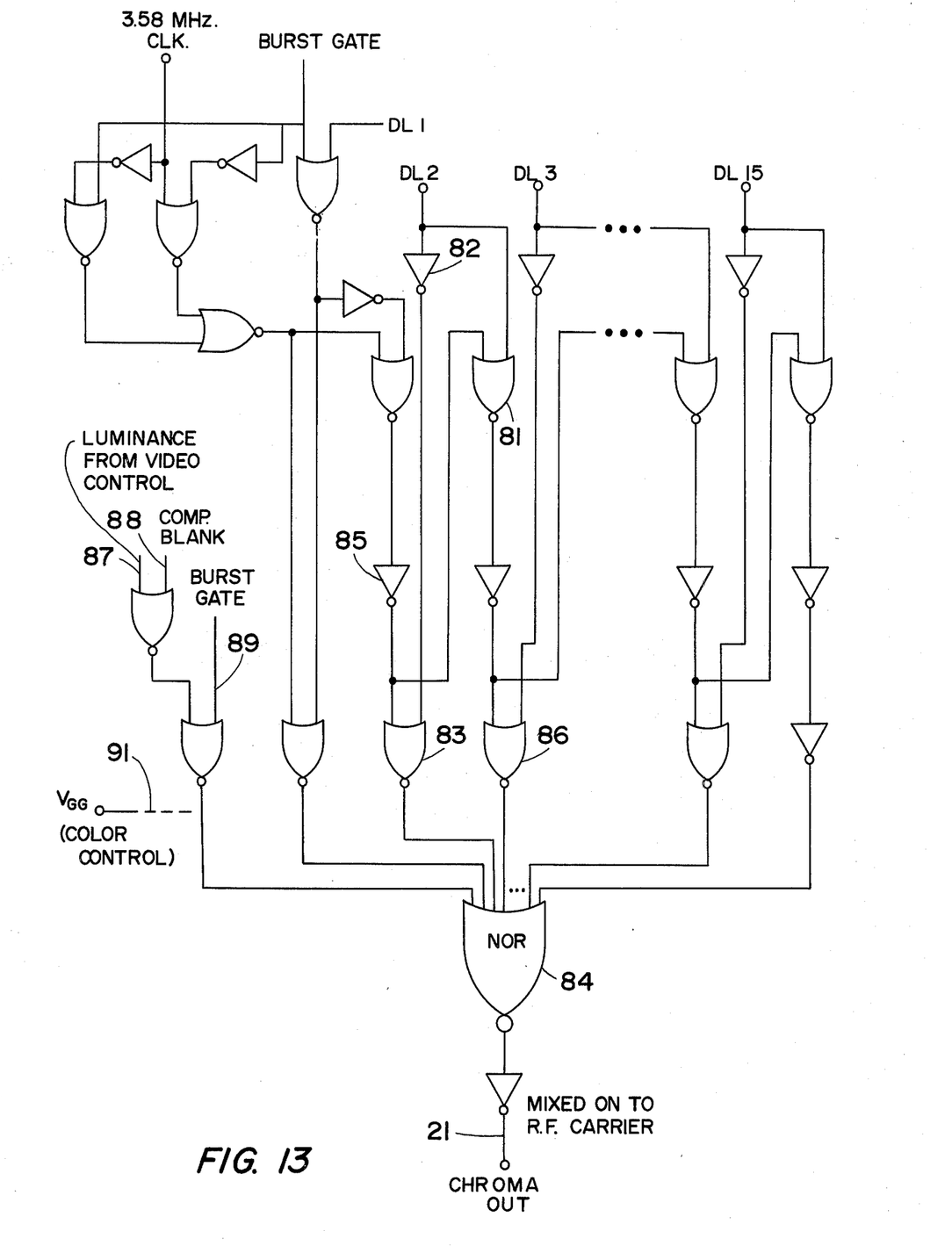
FIG. 13 is a circuit schematic of a portion of FIG. 8 as shown conceptually by FIGS. 11 and 12.
Figure 14:
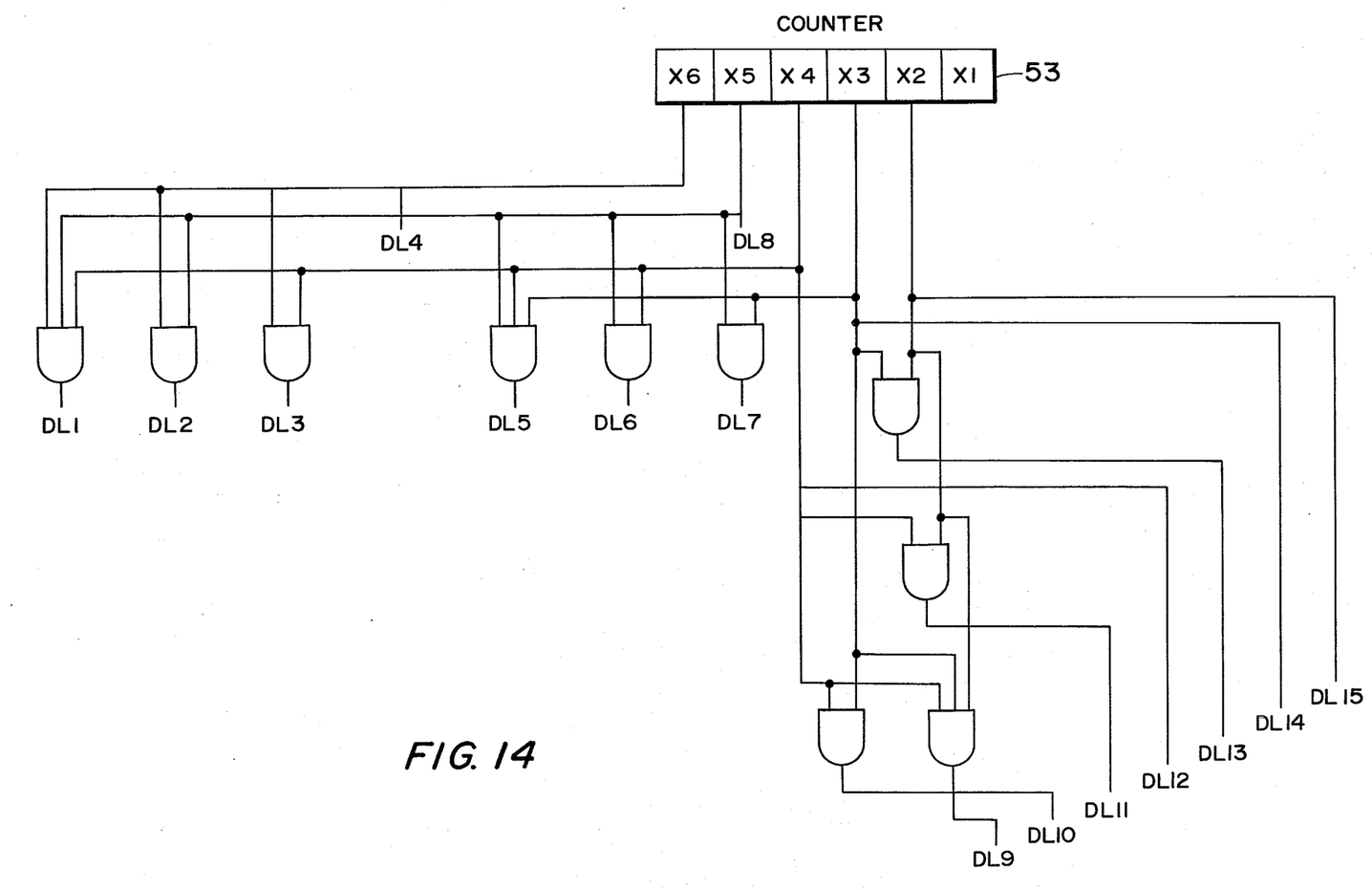
FIG. 14 is the gating circuit for implementing FIG. 14.

The actual configuration of the gating circuit 72 in the preferred embodiment is illustrated in FIG. 13 and the Table I. Referring briefly to Table I, the column designated zero axis count with the heading $X_1$ through $X_6$ are actually the outputs of the registers 54 or 56 (FIG. 8) depending on which register has been selected. Only the most significant bits $X_2$ through $X_6$ are utilized, $X_1$ being disregarded. The normal binary count sequence is illustrated and the corresponding color taps DL1 through DL16 for that particular groups of counts are shown. These DL designations are actually as shown in FIG. 13 the inputs to various gates. The gating necessary for implementing Table I is shown in FIG. 14. Because of the power series nature of the counter, the color taps are selected to maximize the range of color variations. As shown in the column designated approximate frequency range and the corresponding "color" column there are 16 different possible colors which correspond to the zero axis crossing count which is only approximately equivalent to the frequency ranges illustrated. It is believed that the use of the most significant bits promotes optimum variation in color. Thus, the foregoing system provides color zones of different sizes. However, these zones can be varied as desired.

The gating of FIG. 13 operates as follows. An example is given of the DL2 input being activated. This is activated by the two higher order bits $X_6$ and $X_5$ being a one. With a one input at DL2, a one input is thus provided at the gate 81; this one input means that the output of gate 81 will be zero irrespective of the other input. The other input to gate 81 is the color clock signal trying to propogate down the line but it is stopped at the gate 81. At the same time, the DL2 signal is propogated through the inverter gate 82 which proceeds to gate 83. Since inverter 82 inverts its one input the output of gate 82 is a zero. Gate 83 is a NOR gate so that if either one or both of the inputs are 1, the outputs is zero. In this particular case, the output of 83 is the inverse of its other input (the color clock signal from inverter 85) and thus by means of the further NOR gate 84 a signal occurs on line 21. The NOR gate 81 stops the propogation of the color signal so that nothing can occur on NOR gate 86 or subsequent gates. Thus the lowest number DL signal controls; thus the state of any higher number DL signal will have no effect on color selection. This allows the simplified gating of FIG. 14.

Other inputs of the modulator circuit of FIG. 13 are a not luminance input 87, a composite blank signal on line 88, and a burst signal on line 89. Input 87 provides that if there is no luminance output, color is eliminated. This is also true if the composite blank signal on line 88 is a logical one. However, a burst signal on line 89 overrides both of the foregoing.

The time delay is effectively provided by the inverters and NOR gates illustrated in FIG. 13. Lastly, all of the circuits of FIG. 13 are on a single integrated circuit chip and are of the MOS, N channel enhancement mode, integrated variety and thus require a $V_{GG}$ input voltage. However, the $V_{GG}$ input for the delay causing inverters and NOR gates is a separate $V_{GG}$ input 91. Variation of this voltage shifts the delay of all of the delay units and thus shifts the color range. Thus, $V_{GG}$ is in effect the color control which may be varied as shown in FIG. 1. In effect the entire color spectrum is shifted.

Figure 15:
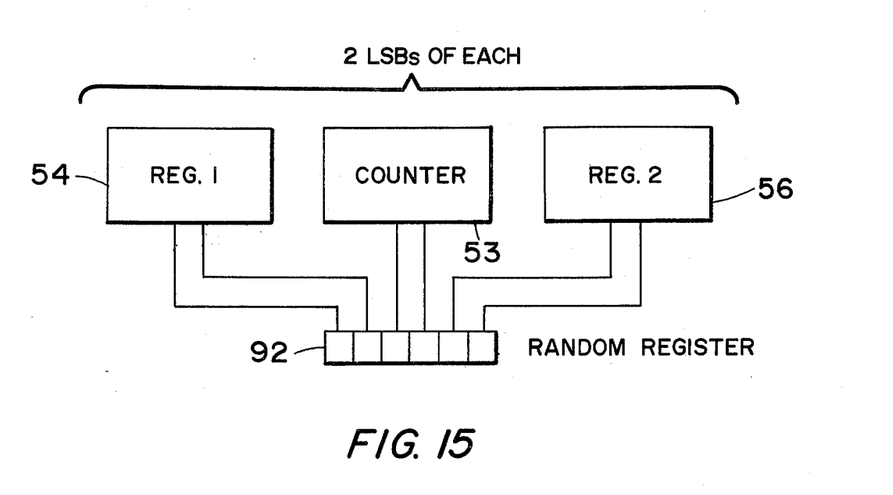
FIG. 15 is a block diagram of the random logic portion of the present invention.

FIG. 15 shows the generation of a random number in random register 92. The two least significant bits of the color registers 54 and 56 and counter 53, see FIG. 8, are utilized since they are more subject to random variation and are more rapidly changing.

Figure 16:
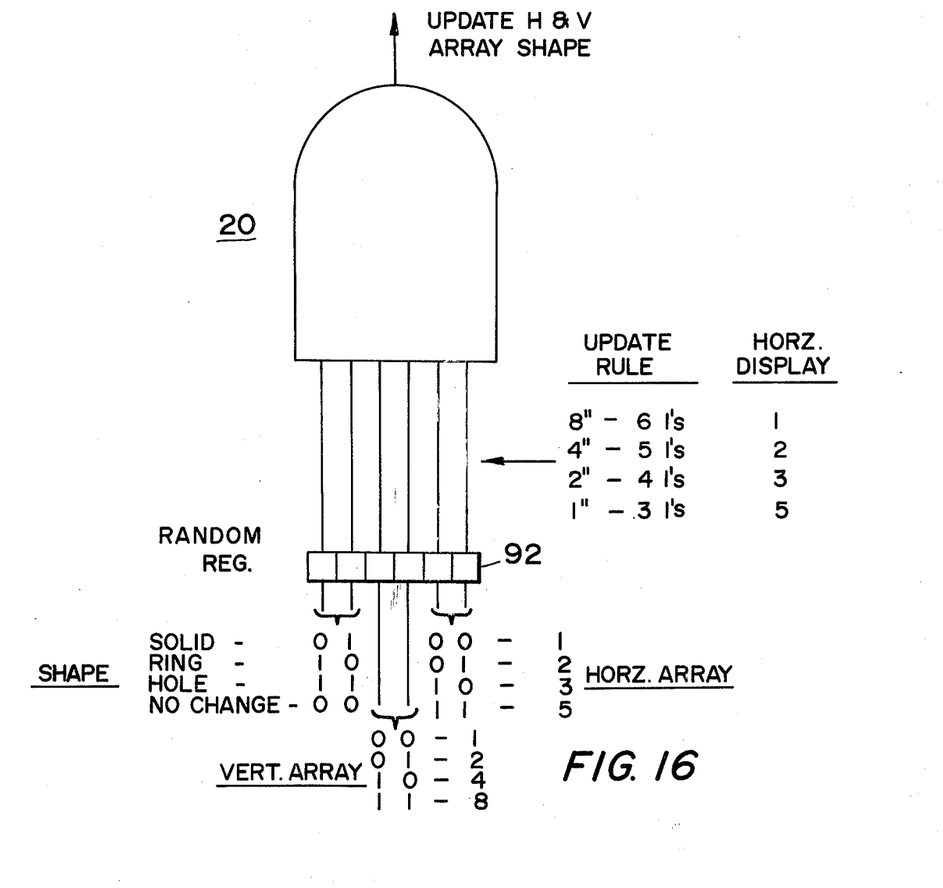
FIG. 16 is a simplified block diagram of the mode select logic in conjunction with the random logic of FIG. 15.

FIG. 16 in combination with FIG. 1 and FIG. 15 illustrates the auto or random mode of operation of the invention. When the auto button is pressed the horizontal and vertical display push buttons take on the new functions illustrated on the lower line. From a circuit standpoint the random register 92 now controls shape and number of arrays as indicated. These are updated at a time interval selected by a horizontal display push button. The times are the approximate random occurances of the number of ones required under the update rule.

However, the VERTICAL DISPLAY push buttons may override a random change of shape to provide only a single selected shape except in the AUTO ALL mode where the operation is as described above.

Thus, an improved interface unit for coupling an audio source to a video display has been provided.

TABLE I

| Zero Axis Count | | | | | | LSB Disregard ↓ Controlling Color Select Line | Approximate Frequency Range | Color |
| $X_6$ | $X_5$ | $X_4$ | $X_3$ | $X_2$ | $X_1$ | | | |
| --- | --- | --- | --- | --- | --- | --- | --- | --- |
| 0 | 0 | 0 | 0 | 0 | 0 | DL16 | | |
| 0 | 0 | 0 | 0 | 0 | 1 | " | 0 – 120 Hz | 16 |
| 0 | 0 | 0 | 0 | 1 | 0 | DL15 | 120 – 240 Hz | 15 |
| 0 | 0 | 0 | 0 | 1 | 1 | " | 240 – 360 Hz | 14 |
| 0 | 0 | 0 | 1 | 0 | 0 | DL14 | 360 – 480 Hz | 13 |
| 0 | 0 | 0 | 1 | 0 | 1 | " | 480 – 600 Hz | 12 |
| 0 | 0 | 0 | 1 | 1 | 0 | DL13 | 600 – 720 Hz | 11 |
| 0 | 0 | 0 | 1 | 1 | 1 | " | 720 – 840 Hz | 10 |
| 0 | 0 | 1 | 0 | 0 | 0 | DL12 | 840 – 960 Hz | 9 |
| 0 | 0 | 1 | 0 | 0 | 1 | " | 960 – 1200 Hz | 8 |
| 0 | 0 | 1 | 0 | 1 | 0 | DL11 | 1200 – 1440 Hz | 7 |
| 0 | 0 | 1 | 0 | 1 | 1 | " | 1400 – 1680 Hz | 6 |
| 0 | 0 | 1 | 1 | 0 | 0 | DL10 | 1680 – 1920 Hz | 5 |
| 0 | 0 | 1 | 1 | 0 | 1 | " | 1920 – 2400 Hz | 4 |
| 0 | 0 | 1 | 1 | 1 | 0 | DL 9 | 2400 – 2880 Hz | 3 |
| 0 | 0 | 1 | 1 | 1 | 1 | " | 2880 – 3360 Hz | 2 |
| 0 | 1 | 0 | 0 | 0 | 0 | DL 8 | 3360 – 3840 Hz | 1 |
| 0 | 1 | 0 | 0 | 0 | 1 | " | | |
| 0 | 1 | 0 | 0 | 1 | 0 | " | ROLLS OVER | |
| 0 | 1 | 0 | 0 | 1 | 1 | " | | |
| 0 | 1 | 0 | 1 | 0 | 0 | DL 7 | | |
| 0 | 1 | 0 | 1 | 0 | 1 | " | | |
| 0 | 1 | 0 | 1 | 1 | 0 | " | | |
| 0 | 1 | 0 | 1 | 1 | 1 | " | | |
| 0 | 1 | 1 | 0 | 0 | 0 | DL 6 | | |
| 0 | 1 | 1 | 0 | 1 | 1 | " | | |
| 0 | 1 | 1 | 1 | 0 | 0 | DL 5 | | |
| 0 | 1 | 1 | 1 | 1 | 1 | " | | |
| 1 | 0 | 0 | 0 | 0 | 0 | DL 4 | | |
| 1 | 0 | 0 | 1 | 1 | 1 | " | | |
| 1 | 0 | 1 | 0 | 0 | 0 | DL 3 | | |
| 1 | 0 | 1 | 1 | 1 | 1 | " | | |
| 1 | 1 | 0 | 0 | 0 | 0 | DL 2 | | |
| 1 | 1 | 0 | 1 | 1 | 1 | " | | |
| 1 | 1 | 1 | 0 | 0 | 0 | DL 1 | | |

What is claimed is:

1. Apparatus for connecting an audio source to a color television receiver and producing an object on the screen of said receiver which varies both in shape and color in response to changes in the characteristics of an audio signal of said audio source comprising: means for generating first and second ramp signals each having a period related to the horizontal and vertical trace times of a frame of a television picture; means for comparing said ramp signals with a characteristic of said audio signal to generate a luminance signal; color modulator means responsive to a characteristic of said audio signal for generating a chroma signal; and means for driving the chroma and luminance circuits of said television receiver with said respective chroma and luminance signals.

2. Apparatus as in claim 1 wherein said ramp signals are V-shaped waveforms.

3. Apparatus as in claim 2 together with means for detecting and integrating said audio signal to provide a waveform representing energy which is said characteristic of said audio signal.

4. Apparatus as in clam 2 together with means for summing said V-shaped waveforms said summed waveform being compared with said characteristic of said audio signal.

5. Apparatus as in claim 4 where said V-shaped waveforms produce at least one substantially diamond shaped object on said screen.

6. Apparatus as in claim 1 together with means for counting the zero crossings of said audio signal said color modulator means being responsive to the count stored in said counting means.

7. Apparatus as in claim 6 where said color modulator means includes a plurality of series connected delay circuits for delaying a color signal and including a plurality of gate means connected between said delay circuits and respectively responsive to a particular stored count to select a delayed color signal to provide said chroma signal.

8. Apparatus as in claim 7 where said count is stored in a register and said color modulator means is responsive to the most significant bits of said register.

9. Apparatus as in claim 7 where said delay circuits are implemented in MOS type integrated circuitry having a $V_{GG}$ terminal and including means for varying the voltage magnitude of $V_{GG}$ to concurrently change the delay of said delay circuits.

10. Apparatus as in claim 7 where said count is stored in a register and said gating means is connected to said register in a manner to maximize the range of color variation with respect to the frequency ranges of a plurality of audio sources.

11. Apparatus as in claim 6 where said audio source is stereo together with means for alternately switching said stereo channels into said counting means.

12. Apparatus as in claim 11 where said switching means is responsive to even and odd frames.

13. Apparatus as in claim 8 where said audio source is stereo and together with a pair of said registers for storing said count of respective stereo channels.

14. Apparatus as in claim 13 including color select and switching means for connecting one register at a time to said color modulator means.

15. Apparatus as in claim 2 where said audio source is stereo together with shape selector means for selectively ORing or exclusively ORing said stereo signals.

16. Apparatus as in claim 15 where said shape selector means includes time delay means responsive to the output of said exclusive ORing means for providing a ring shaped object on said screen.

17. Apparatus as in claim 4 where said means for generating said V-shaped waveforms includes means for multiplying the frequency of said waveforms to provide multiple objects on said screen.

18. Apparatus as in claim 17 including means for randomly varying the number of said multiple objects.

19. Apparatus as in claim 16 for randomly varying said shape selector means.

20. Apparatus for connecting an audio source to a color television receiver and producing an object on the screen of said receiver which varies both in shape and color in response to changes in the characteristics of an audio signal of said audio source comprising: means for generating a reference signal having a period related to the horizontal and vertical trace times of a frame of a television picture; means for comparing said reference signal with a characteristic of said audio signal to generate a luminance signal having leading and trailing edges; shape selector means for processing said luminance signal to provide a ring shaped object on said screen including time delay means responsive to said leading and trailing edges of said luminance signal; color modulator means responsive to a characteristic of said audio signal for generating a chroma signal; and means for driving the chroma and luminance circuits of said television receiver with said respective chroma and processed luminance signals.

21. Apparatus as in claim 20 where said time delay means includes first and second counters respectively responsive to said leading and trailing edges.

22. Apparatus as in claim 21 where said counters are connected together by an inverter.

23. Apparatus as in claim 21 where said counters are clocked a predetermined number of counts by a clock pulse having a pulse repetition rate related to said horizontal trace time.

24. Apparatus as in claim 20 where said reference signal is V-shaped and said characteristic is the energy of said audio signal.

25. Apparatus for generating a chroma signal for driving the chroma circuit of a color television type display comprising: means for generating a color clock signal; a plurality of series connected delay circuits for delaying said color signal said delay circuits being implemented in MOS enhancement mode integrated circuitry having a $V_{GG}$ terminal and including means for varying the voltage magnitude of $V_{GG}$ to concurrently change the delay of said delay circuits; and a plurality of gate means connected between said delay circuits for selecting a delayed color signal to provide said chroma signal.

* * * * *